United States Patent [19]

Yang

[11] Patent Number: 4,895,117

[45] Date of Patent: Jan. 23, 1990

[54] INTERNAL COMBUSTION ENGINE

[76] Inventor: Tai-Her Yang, 5-1,Tai-Pin Street, Si-Hu Town, Dzan-Hwa, Taiwan

[21] Appl. No.: 170,831

[22] Filed: Mar. 18, 1988

Related U.S. Application Data

[63] Continuation of Ser. No. 737,261, May 23, 1985, abandoned, which is a continuation-in-part of Ser. No. 363,932, Jul. 13, 1988, abandoned, which is a continuation-in-part of Ser. No. 397,870, Jul. 13, 1982, abandoned.

[51] Int. Cl.[4] .............................................. F02B 53/00
[52] U.S. Cl. ..................................... 123/222; 123/228
[58] Field of Search ................ 123/222, 228, 229, 231

[56] References Cited

U.S. PATENT DOCUMENTS

| 1,307,287 | 6/1919 | Ward | 123/222 |
|---|---|---|---|
| 1,974,282 | 9/1934 | Kempton | 123/222 |
| 2,172,039 | 9/1939 | Shore | 123/228 |
| 2,690,166 | 9/1954 | Shore | 123/228 |
| 3,796,196 | 3/1974 | Baker | 123/222 |
| 3,814,064 | 6/1974 | Hanes | 123/222 |

FOREIGN PATENT DOCUMENTS

| 93122 | 6/1923 | Austria | 123/228 |
|---|---|---|---|
| 2377526 | 9/1978 | France | 123/228 |

Primary Examiner—Michael Koczo
Attorney, Agent, or Firm—Leonard Bloom

[57] ABSTRACT

An internal combustion engine includes a set of gas chambers including a compression chamber for compressing a fuel/gas mixture and a combustion and exhaust chamber for combusting the fuel/gas mixture and for exhausting the waste gases. The compression chamber and the combustion and exhaust chamber are defined by a stationary wall and a moving wall. Means are provided for sequestering a portion of the gases in the compression chamber. The sequestering means are controlled by the position of the sequestering means with respect to the wall of the compression chamber. A transfer chamber saves the sequestering gases and releases the sequested gases into the combustion and exhaust chamber at a predetermined time in the engine cycle before the gases are exhausted from the engine. The gas sequestering and transfer means can be used in a rotary engine, a linear engine, and a reciprocating engine.

16 Claims, 5 Drawing Sheets

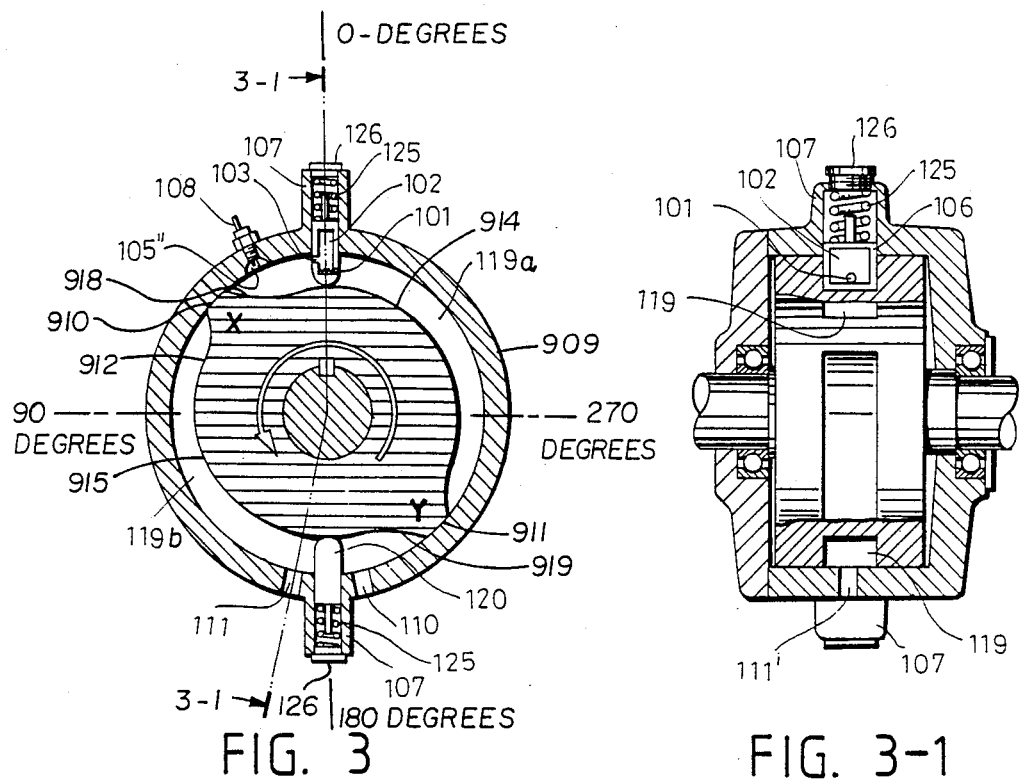
FIG. 3
FIG. 3-1
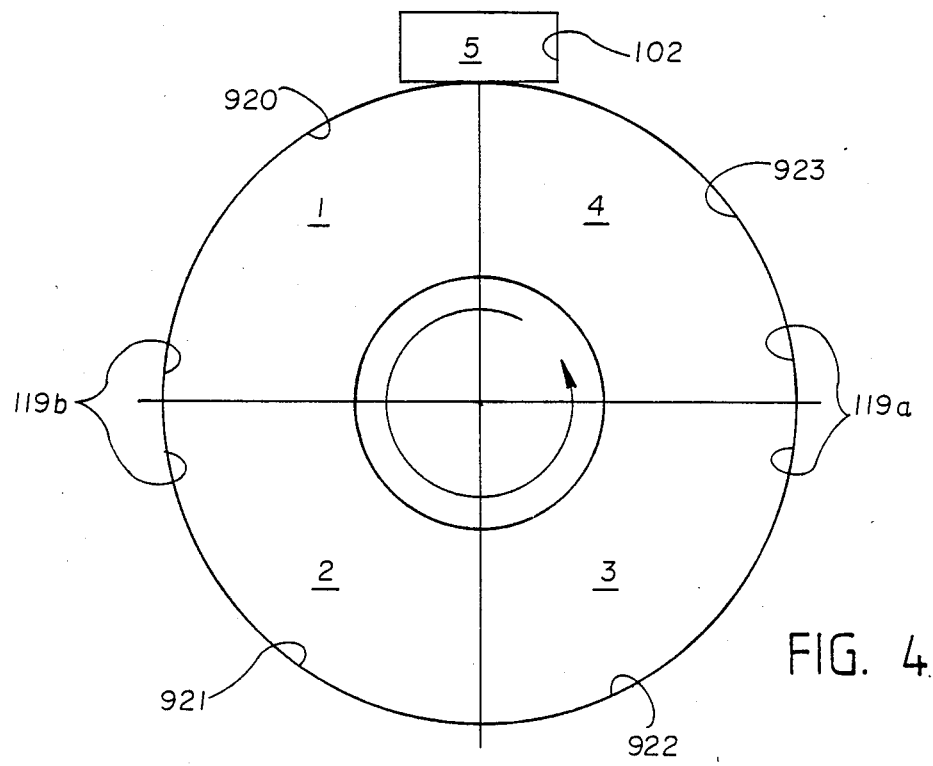
FIG. 4

TABLE I
OPERATION OF THE EMBODIMENT SHOWN IN FIG. 3-3-7

| | FIG. | POSITION OF SEALING END "X" ANG | Cc (119a) A* | Cc (119a) B* | Cc (119a) C* | Cc (119a) D* | INTERNAL Gy | Cc'(119b) A* | Cc'(119b) B* | Cc'(119b) C* | Cc'(119b) D* |
|---|---|---|---|---|---|---|---|---|---|---|---|
| FIRST REV. | | 0° | | | | | | | | | |
| | | 30° | INTAKE STROKE (-) | | | | TRANSFER CHAMBER 102 | | | | |
| | | 60° | | | | | | | | | |
| | | 90° | | | | | | | | | |
| | | 120° | | | | | | | | | |
| | | 150° | | | | | | | | | |
| | | 180° | | | | | | | | | |
| | | 210° | | COMPRESSIVE STROKE (-) | | | E* | INTAKE STROKE (=) | | | |
| | | 240° | | | | | | | | | |
| | | 270° | | | | | | | | | |
| | | 300° | | | | | | | | | |
| | | 330° | | | | | | | | | |
| | | 360° | | | | | | | | | |
| SUBSEQUENT REVOLUTIONS | 3-2 | 30° | INTAKE (=) | | | | Gy–Cc' SAVE PRESSURE Cc'–Gy | | COMPRESSIVE STROKE (=) | IGNITION DYNAMIC STROKE (-) | |
| | 3-3 | 60° | | | | | | | | | |
| | | 90° | | | | | | | | | |
| | | 120° | | | | | | | | | |
| | 3-4 | 150° | | | | | | | | | |
| | | 180° | | | | | | | | | |
| | 3-5 | 210° | | COMPRESSIVE STROKE (≡) | IGNITION DYNAMIC STROKE (≡) | | Gy—Cc SAVE PRESSURE Cc—Gy | INTAKE STROKE (=) | | | EXHAUST STROKE (-) |
| | | 240° | | | | | | | | | |
| | 3-6 | 270° | | | | | | | | | |
| | | 300° | | | | | | | | | |
| | | 330° | | | | | | | | | |
| | 3-7 | 360° | | | | | | | | | |

Cc: Common gas chamber.- 119a
Cc': Common gas chamber which has reverse phase with Cc.- 119b
Gy: Gate plate with pressure-saved chamber.

* A = Intake
  B = Compression
  C = Dynamic Power
  D = Exhaust
  E = fuel gas of gas chamber Cc compresses and passes through one-way valve of Gy to enter into pressure-saved chamber. (Cc-Gy)

TABLE 2

| POSITION OF SEALING END "X" (DEG) | POSITION OF SEALING END "Y" (DEG) | CHAMBER PORTION | | | | | FIG. |
|---|---|---|---|---|---|---|---|
| | | 1 (920) | 2 (921) | 3 (922) | 4 (923) | 5 (102) | |
| (TOP) 0 | 180 | IGNITION AND COMBUSTION | EXHAUSTING | INTAKE OF FUEL/AIR MIXTURE | COMPRESSION OF FUEL/AIR MIXTURE | COMPRESSED FUEL/AIR MIXTURE IS SAVED | 3-7 |
| 30 | 210 | | | | | SAVED FUEL/AIR MIXTURE IS RELEASED TO COMB. CH 920 | 3-2 |
| 60 | 240 | | | | | COMPRESSING F/A MIXTURE ENTERS 102 | 3-3 |
| 90 | 270 | | | | | | |
| 120 | 300 | | | | | | |
| 150 | 330 | | | | | | |
| (BOTTOM) 180 | 360 (0) | IGNITION AND COMBUSTION | EXHAUSTING | INTAKE OF FUEL/AIR MIXTURE | COMPRESSION OF FUEL/AIR MIXTURE | COMPRESSED F/A MIXTURE IS SAVED IN 102 | 3-4 |
| 210 | 30 | | | | | SAVED FUEL/AIR MIXTURE IS RELEASED TO COMB. CH. 920 | 3-5 |
| 240 | 60 | | | | | COMPRESSING F/A MIXTURE ENTERS 102 | 3-6 |
| 270 | 90 | | | | | | |
| 300 | 120 | | | | | | |
| 330 | 150 | | | | | | |
| 360 (0) | 180 | | | | | | |

INTERNAL COMBUSTION ENGINE

CROSS-REFERENCE TO CO-PENDING APPLICATION

The present invention is a continuation application of Ser. No. 737,261 filed May 23, 1985, abandoned which is a C-I-P application of co-pending application Ser. No. 363,932 filed July 13, 1982, abandoned, and application Serial No. 397,870 filed July 13, 1982, abandoned.

FIELD OF THE INVENTION

The present invention relates to the field of internal combustion engines, and more particularly to internal combustion engines having a device that saves a portion of the pressurized gases in the compression chamber and transfers the pressurized gases to the combustion and exhaust chamber at the appropriate time in the engine cycle.

BACKGROUND OF THE INVENTION

In the art of internal combustion engines, engines having gas chambers which are separate and distinct from the compression chamber and the combustion and exhaust chamber are known as exemplified by the following known patents: U.S. Pat. No. 3,921,595; French Pat. No. 1,335,918; Great Britain Pat. Nos. 31,541; 197,811; German Pat. No. 1,814,899; German Pat. No. 2,847,890; Canadian Pat. No. 1,006,442; and U.S. Pat. No. 4,096,846.

None of the known engines provide an engine having all of the following desirable characteristics: improved driving efficiency; decreased pollution; decreased vibration; clockwise and counterclockwise operation; and applicability to either rotary, linear, or reciprocating engine operation.

SUMMARY OF THE INVENTION

Accordingly, it is an object of the present invention to provide an improved internal combustion engine having a separate gas chamber in addition to the compression chamber and the combustion and exhaust chamber.

Another object of the invention is to provide an internal combustion having a separate pressure-saving and transfer chamber in addition to the compression chamber and the combustion and exhaust chamber.

Another object of the invention is to provide an engine having improved driving efficiency, decreased pollution, and decreased vibration.

Yet another object of the invention is to provide an improved engine permitted selectable clockwise or counterclockwise operation.

Still another object of the invention is to provide an improved pressure-saving and transfer internal combustion engine capable of being designed as either a rotary, linear, or reciprocating engine.

In accordance with the principles of the invention, an internal combustion engine is provided which includes a compression chamber for compressing a fuel/gas mixture, a combustion and exhaust chamber for exhausting the waste gases, means for sequestering a portion of the engine gases from the compression chamber, means for saving the sequestered gases, and means for releasing the sequested gases into the combustion and an exhaust chamber at a predetermined time in the engine cycle before the gases are exhausted from the engine. The compression chamber and the combustion and an exhaust chamber are defined by a stationary wall and a moving wall.

In operation, a portion of the compressed gases in the compression chamber are sequestered from the remainder of the gases in the compression chamber and saved to be released into the combustion and exhaust chamber at the appropriate time in the engine cycle.

The means for sequestering a portion of the compressed gases are controlled by the position of the sequestering means with respect to the wall of the compression chamber.

The internal combustion engine can be a four-cycle rotary engine, a two-cycle rotary engine, a four-cycle reciprocating engine, a two-cycle reciprocating engine, or a linear engine.

The compression chamber can be substantially symmetrical to the combustion and an exhaust chamber. The compression chamber can have a lower height or can be shallower than the combustion chamber.

The rotating wall can be located inside the stationary wall or located outside the stationary wall.

The fuel/air mixture can be supplied to the gas chamber by a fuel/air mixture chamber which can be located in a gas-channeling groove along a gas chamber wall. The fuel/air mixture chamber can be located on the stationary wall or on the moving wall of the gas chamber.

The combustion gases are exhausted from the gas chamber by a waste gas chamber which can be in the form of a gas-channeling groove located along a gas chamber wall. The waste gas chamber can be located on the stationary wall or on the moving wall of the gas chamber.

The compression chamber and the combustion and exhaust chamber can be juxtaposed in a parallel manner with gas-channeling grooves permitting communication between parallel chambers. The parallel chambers can be offset from one another.

The compression chamber and the combustion and exhaust chamber can be in the form of a single rotating element subdivided into two rotating chambers arranged in parallel planes along the longitudinal axis.

In accordance with another aspect of the invention, the means for sequestering a portion of the gases in the compression chamber, the means for saving the sequestered gases, and the means for releasing the sequestered gases into the combustion and exhaust chamber is contained in a gate plate means supported by one of the gas chamber walls and extends toward and is in sliding contact with the other wall which serves as a camming surface for controlling the gate plate.

The gate plate includes: a housing; a piston received by the housing wherein the piston has a piston wall which defines a pressure saving and transfer chamber inside the piston; a gas transmission guide hole located in the wall of the piston on a side of the piston wherein the gas transmission guide hole is blocked and unblocked by the wall supporting the gate plate, the blocking and unblocking of the gas transmission guide hole being controlled by the contact of the gate plate against the wall serving as the camming surface.

The gas transmission guide hole is in direct communication with the gas chamber when the guide hole is unblocked by the wall supporting the gate plate. A one-way intake valve is located in the piston on a side of the piston opposite to the side of the location of the gas transmission guide hole. The one-way intake valve in direct communication with the gas chamber when the intake valve is open. The gate plate means also includes a bias spring for urging the piston out of the housing toward the camming surface.

In accordance with another aspect of the invention, the engine can be capable of being driven either clockwise or counterclockwise by controlling an intake means, an exhaust means, and an ignition means, by using two gate plates in opposing relation wherein each gate plate has a pressure-shunting subgate at the tip of the gate plate.

With the invention, the stationary wall can support the gate plate; and the moving wall can serve as a camming surface for the gate plate. Alternatively, the moving wall can support the gate plate; and the stationary wall can serve as a camming surface for the gate plate.

The gate plate means serves to trap the fuel/air mixture in the compression chamber and retains a portion of the fuel/air mixture in the pressure saving and a transfer chamber inside the gate plate until the gate plate reaches the combustion and exhaustion chamber at which time the trapped fuel/air mixture can be released from the gate plate to the combustion and exhaustion chamber. As long as gate plate is in the compression chamber, the gas transmission guide hole is blocked, and the compressed fuel/air mixture trapped within the pressure saving and transfer chamber cannot escape. When the gate plate reaches the combustion chamber, which can have a greater height than the compression chamber, the gas transmission guide hole becomes unblocked and releases the trapped compressed fuel/air mixture into the combustion chamber.

With the invention, the moving wall can rotate with respect to the stationary wall to form a rotating wall. The gate plates can be supported by the rotating wall or by the stationary wall.

The gas transmission guide hole can include sealing means for providing a substantially air-tight seal when the engine operates at low speed.

The bias spring for the gate plate can be an adjustable spring.

In accordance with another aspect of the invention, the means for sequestering a portion of the gases in the compression chamber can be a gate plate which includes an internal valve; and the means for saving the sequestered gases can be a separate pressure-saving chamber located between the compression chamber and the combustion and exhaust chamber. The means for releasing the sequestered gases from the separate pressure-saving chamber into the combustion and exhaust chamber is a channel for conducting the gases whereby the opening and closing of the channel are controlled by the relative positions between the separate pressure-saving chamber and the combustion and exhaust chamber.

In accordance with another aspect of the invention, a gate plate for an internal combustion engine is provided. The gate plate includes a cylindrical housing; a piston received by the housing, the piston having a piston wall which defines a pressure saving and transfer chamber inside the piston. A gas transmission guide hole is located in the wall of the piston on a side of the piston. A one-way intake valve is located in the piston on a side of the piston opposite to the side of the location of the gas transmission guide hole. A bias spring urges the piston out of the housing. In operation, the gas transmission guide hole, the pressure saving and a transfer chamber, and the one-way intake valve provide a path for gas flow from one side to the other side of the piston.

With the gate plate of the invention, the piston has a proximal end toward the housing and has a distal end away from the housing. The gas transmission guide hole can be located near the proximal end of the piston wall. The gas transmission guide hole is capable of being blocked by the wall of the housing. A one-way intake valve is located near the distal end of the piston. With the gate plate, the one-way intake valve can be spring-biased in the closed position.

BRIEF DESCRIPTION OF THE DRAWINGS

FIG. 1—1 is a partially exploded view of an embodiment of a gate plate 106 having a one-way intake valve 101 including a spring-biased ball valve serving as the valve for the aperture.

FIG. 2—1 is like the view in FIG. 2 wherein the gas transmission guide hole 103 is unblocked as controlled by a camming surface and wherein the one-way intake valve 101 is closed.

FIG. 3—1 is a longitudinal cross-sectional view of the embodiment shown in FIG. 3 taken along line 3—1—3—1.

FIGS. 3—2 through 3—7 are axial cross-sectional views showing in sequence the engine cycle for a rotary internal combustion engine having gate plates carried by an outer stationary wall, having camming surfaces on the internal moving wall, having two gas chambers 119 alternately serving for compression, combustion, and exhaustion, and having the intake and exhaust ports 110 and 111 respectively in the external stationary wall.

FIG. 3—8 (Table 1) is a table depicting the relationships between the stages of engine operation and the flow of gases in the engine in relation to the sequence of events shown in FIGS. 3—2 through 3—7.

FIG. 4 is a schematic representation of the five chamber portions that undergo cyclic change during engine operation.

FIG. 5 (Table 2) is a table depicting the relationships between the five engine chamber portions shown in FIG. 4 during engine operation.

DETAILED DESCRIPTION OF THE PREFERRED EMBODIMENT

Figure 1:
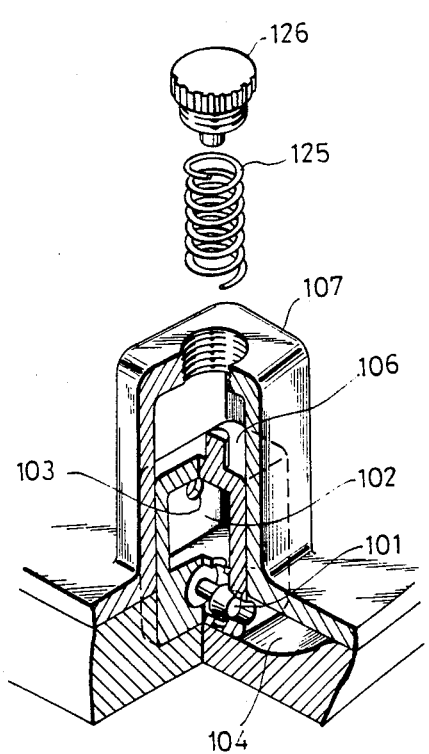
FIG. 1 is a partially exploded view of an embodiment of a gate plate 106 having a one-way intake valve 101 including a hydraulic piston serving as the valve for the aperture.
Figure 1:
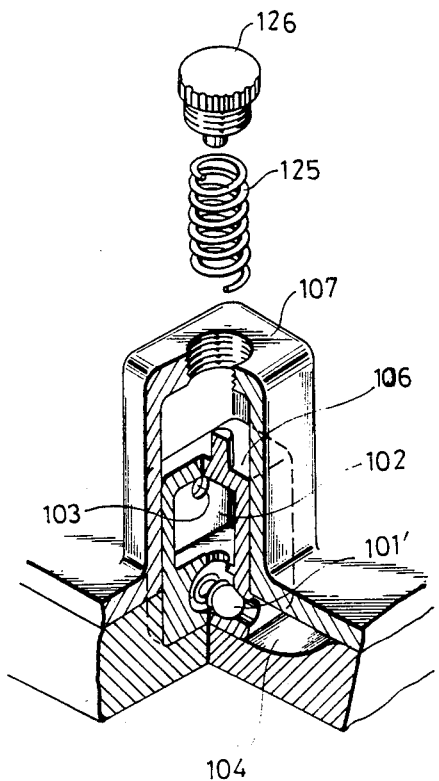
Figure 2:
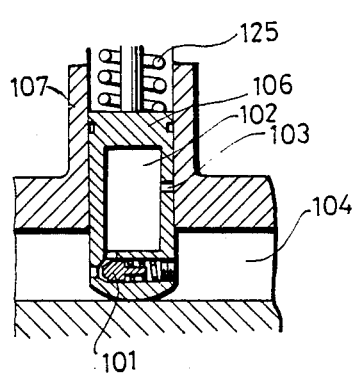
FIG. 2 is a longitudinal cross-sectional view of the gate plate embodiment shown in FIG. 1—1 wherein the gas transmission guide hole 103 is blocked by an engine wall as controlled by a camming surface and wherein the one-way intake valve 101 is open.
Figures 1, 2:
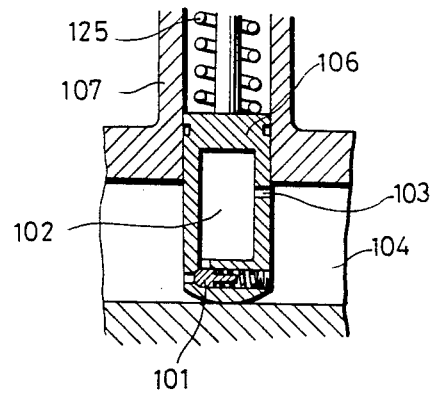

The structures comprising gate plates 106 are shown in detail in FIGS. 1, 1—1, 2, and 2—1. The gate plate 106 includes a piston housed in housing 107. The piston is biased toward the camming surfaces by spring 125. The piston is hollow and defines the pressure saving and gas transferring chamber 102. The tension on the bias spring 125 can be adjusted by turning cap 126.

The operation of the gate plate 106 is illustrated in FIGS. 2 and 2—1. In FIG. 2, the gate plate 106 is situated in the compression chamber 104. Under the influence of the gas pressure in the compression chamber, the bias force in a spring biased internal valve 101 is overcome thereby opening the valve and permitting gas under pressure to enter into the internal pressure saving and transfer chamber 102 in the piston. The pressure is retained in the piston as long as orifice 103 is blocked by the wall of the compression chamber as shown in FIG. 2.

When the gate plate 106 is no longer subjected to the gas pressure of the compression chamber, the bias in the spring biased internal valve 101 is no longer overcome, and the valve closes under the influence of the biasing spring. During this period of the engine cycle, the pressurized gases that entered the pressure saving and transfer chamber 102 are trapped therein. The gases cannot escape because the orifice 103 is blocked by the wall of the gas chamber, and the valve 101 is shut.

Figures 2, 3:
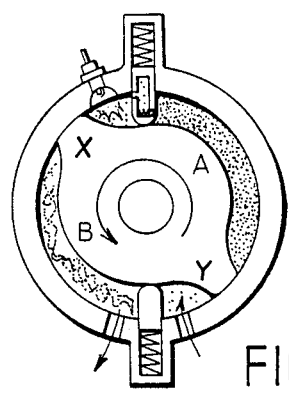
FIG. 3 is an axial cross-sectional view of a rotary internal combustion engine having gate plates carried by an outer stationary wall, having camming surfaces on the internal moving wall, having two gas chambers 119 alternately serving for compression, combustion, and exhaustion, and having the intake and exhaust ports 110 and 111 respectively in the external stationary wall.
Figures 3, 4, 5:
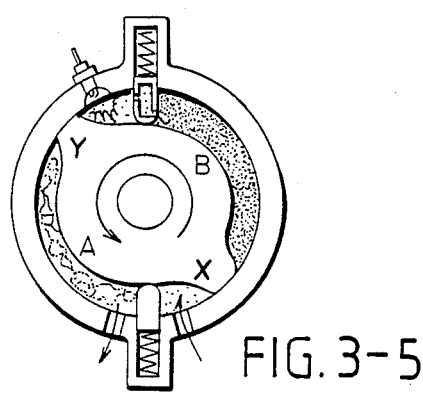
Figure 3:
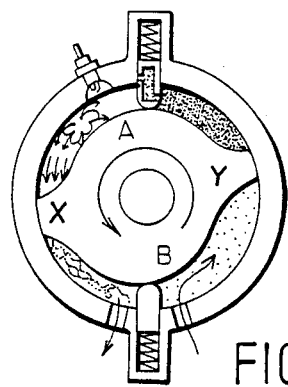
Figures 3, 4, 5, 6:
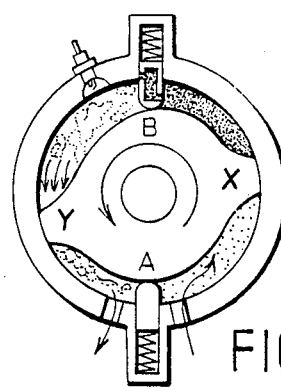
Figures 3, 4:
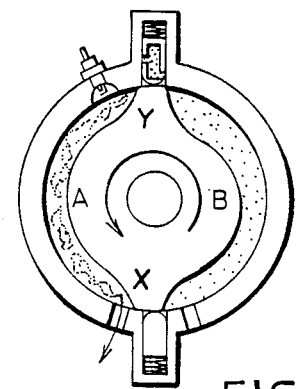
Figures 3, 4, 5, 6, 7:
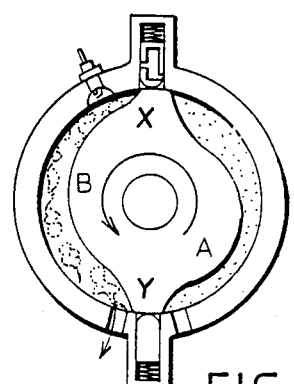

When the gate plate 106 reaches the portion of the engine cycle shown in FIG. 2—4, the gate plate is in the combustion and exhaust chamber 105 which is deeper than the compression chamber. The greater depth of the combustion and exhaust chamber permits the orifice 103 to clear the wall of the gas chamber thereby permitting the gases that were trapped inside the chamber 102 to escape into the combustion and exhaust chamber.

In FIG. 1 the gate plate 106 has a one-way intake valve 101 including a hydraulic piston serving as the valve for the aperture.

In FIG. 1—1 the gate plate 106 has a one-way intake valve 101 including a spring-biased ball valve serving as the valve for the aperture.

FIG. 2 shows the gate plate wherein the gas transmission guide hole 103 is blocked by an engine wall and is controlled by a camming surface and wherein the one-way intake valve 101 is open.

In FIG. 2—1 wherein the gas transmission guide hole 103 in FIG. 2 is unblocked as controlled by a camming surface and wherein the one-way intake valve 101 is closed.

FIG. 3 is an axial cross-sectional view of a rotary internal combustion engine having a gate plate 106 carried by an outer stationary wall 909. The gate plate 106 includes an internal pressure saving and transfer chamber 102 that serves as means for sequestering, saving, and releasing a portion of the gases in the compression chamber. At 180 degrees opposite the gate plate 106 is located a solid, spring-loaded plate 120. Reading counterclockwise around the engine beginning at the gate plate 106, the region from the gate plate 106 to the solid plate 120 defines the combustion and exhaust chamber 119b. Continuing counterclockwise, the region from the solid plate 120 to the gate plate 106 defines the fuel intake and compression chamber 119a.

An internal rotor 912 has wall surfaces 914 and 915 and sealing ends "X" and "Y". The sealing ends "X" and "Y", in conjunction with the stationary outer wall of the engine, define the combustion and exhaust chamber 119b and the fuel intake and compression chamber 119a. The rear surfaces 918 and 919 of sealing ends "X" and "Y" respectively are gently sloped to provide camming surfaces 918 and 919 for the gate plate 106 that cause the internal pressure saving and transfer chamber 102 to retain the saved gases until a suction is provided in the combustion and exhaust chamber. In this way, the release of the saved gases is delayed until a suction is created in the combustion chamber. Once the saved fuel/air mixture is released into the combustion chamber, the ignition source ignites the mixture.

The operation of the internal pressure saving and transfer chamber 102 is controlled by the position of the gate plate 106 with respect to the internal rotating wall surfaces of the rotor. Camming surfaces 914 and 915 and 918 and 919 are on the internal moving wall. Intake and exhaust ports 110 and 111, respectively, are located in the external stationary wall 909.

More specifically with respect to correlating FIGS. 3—2 through 3—7 with the Table 1, it is pointed out that the first engine revolution, from approximately 0 to approximately 360 degrees occurs prior to the engine conditions represented by FIG. 3—2. As the rotor 912 begins its first revolution in a counterclockwise manner, as sealing end "X" moves from 0 to approximately 170 degrees and as sealing end "Y" moves from approximately 180 to approximately 350 degrees, a gasoline and air mixture is sucked into chamber 119a through inlet port 110. During this stage of the engine cycle, internal pressure saving and transfer chamber 102 of the gate plate 106 is essentially empty. Also at this stage of the engine cycle, chamber 119b is empty, except for atmospheric air.

During the first revolution, as sealing end "X" moves from approximately 170 degrees to approximately 360 degrees, the gasoline and air mixture present in chamber 119a undergoes a compression. Almost concurrently, as the gasoline and air mixture is compressed in chamber 119a, from approximately 190 degrees to approximately 360 degrees, the internal pressure saving and transfer chamber 102 of the gate plate 106 is receiving the gasoline and air mixture for sequestration. This aspect of the first revolution is shown clearly in Table 1 under column Gy.

Once the first revolution has been completed, the portions of Table 1 relating to FIGS. 3—2 through 3—7 come into play as shown in the leftmost column of Table 1.

FIG. 3—2 represents the second revolution and subsequent revolutions at approximately 30 degrees into a counterclockwise revolution. FIG. 3—3 represents the second revolution and subsequent revolutions at approximately 100 degrees into a counterclockwise revolution. FIG. 3—4 represents the second revolution and subsequent revolutions at approximately 180 degrees into a counterclockwise revolution. FIG. 3—5 represents the second revolution and subsequent revolutions at approximately 125 degrees into a counterclockwise revolution. FIG. 3—6 represents the second revolution and subsequent revolutions at approximately 280 degrees into a counterclockwise revolution. FIG. 3—7 represents the second revolution and subsequent revolutions at approximately 360 degrees into a counterclockwise revolution.

In FIG. 4, the engine chambers are schematically divided into five portions 920, 921, 922, 923, and internal pressure saving and transfer chamber 102 whose contents are constantly changing during engine operation. The internal pressure saving and transfer chamber 102 is located inside the gate plate portion 106.

As shown in FIG. 4, chamber portion 920 is the portion of chamber 119b that is located between the gate plate 106 and a sealing end "X" or "Y" depending on the portion of the engine cycle.

As shown in FIG. 4, chamber portion 921 is the portion of chamber 119b that is located between the sealing end "X" or "Y" and the solid, spring-biased plate 120 depending on the portion of the engine cycle.

As shown in FIG. 4, chamber portion 922 is the portion of chamber 119a that is located between the solid, spring-biased plate 120 and a sealing end "X" or "Y" depending on the portion of the engine cycle.

As shown in FIG. 4, chamber portion 923 is the portion of chamber 119a that is located between the sealing end "X" or "Y" and the gate plate 106 depending on the portion of the engine cycle.

FIG. 5 (Table 2) is a table showing the timing relationships between the chamber portions 920, 921, 922, 923, and 102 during engine operation. From FIG. 5 it is clear that the operations of chamber 920, 921, 922, and 923 are synchronized during engine operation. However, the operation of internal pressure saving and transfer chamber 102 has significantly different timing relationships.

More specifically with respect to the timing relationships of internal pressure saving and transfer chamber 102, the first block in Table 2 (corresponding to FIG. 3—7) represents the time period in the engine cycle when fuel/air mixture is actually being saved in the internal pressure saving and transfer chamber 102. It is apparent that the time period for saving the fuel/air mixture in the internal pressure saving and transfer chamber 102 begins prior to the beginning of the cycling of the other four chambers. It is also apparent that the time period for saving the fuel/air mixture ends after the cycling of the other four chambers has begun.

From the second block under the internal pressure saving and transfer chamber 102 in FIG. 5, the beginning part of the second block corresponding to FIG. 3—2, it is apparent that during the cycling of the other four chambers, the internal pressure saving and transfer chamber 102 releases its fuel/air mixture to the combustion chamber 920 at a period of time that is subsequent to beginning of the cycling of the other four chambers. In this way, there is both a time delay and a partial vacuum created in the chamber portion 920 prior to release of the fuel/air mixture from the internal pressure saving and transfer chamber 102 to the chamber portion 920. Then ignition takes place.

During the engine cycle, after the saved fuel/air mixture has been released to the combustion chamber 920, freshly intaken fuel/air mixture which entered through orifice 110 is compressed in chamber portion 923 (see FIG. 3—3 also). After being compressed, the compressed fuel/air mixture is saved in the internal pressure saving and transfer chamber 102 (corresponding to FIG. 3—4). The time period for saving the compressed fuel/air mixture in the internal pressure saving and transfer chamber 102 begins before one half (180 degrees) of a complete engine cycle occurs and ends after the second half of the engine cycle has commenced.

As described above in relation to the first time block for the internal pressure saving and transfer chamber 102 in the first half of the engine cycle, the second half of the engine cycle begins with a partial suction being created in the combustion chamber portion 920 before the saved fuel/air mixture retained in chamber 102 is released to the combustion chamber 920. And as in the first half of the cycle, the entry of saved fuel/air mixture into the chamber portion 920 in the second half of the engine cycle is delayed (see FIG. 3—5) until a partial suction is created in the chamber portion 920. Then ignition takes place.

The remainder of the second half of the engine cycle repeats the first half of the cycle. More specifically, a new quantity of fuel/air mixture is drawn into chamber portion 923, and the fuel/air mixture is compressed. During this time, the compressed fuel/air mixture enters the internal pressure saving and transfer chamber 102 (see FIG. 3—6). As in the first half of the engine cycle, the transfer of the compressed fuel/air mixture to the internal pressure saving and transfer chamber 102 in the second half of the engine cycle ends, and the transferred mixture begins to be saved in the internal pressure saving and transfer chamber 102 before the other four engine chambers complete an engine cycle.

Obviously, many modifications may be made without departing from the basic spirit of the present invention. Accordingly, it will be appreciated by those skilled in the art that within the scope of the appended claims, the invention may be practiced other than has been specifically described herein.

I claim:

1. An internal combustion engine, comprising:
   gas chamber means including a fuel/air mixture intake and compression chamber for compressing a fuel/gas mixture and a combustion and exhaust chamber for combusting the fuel/gas mixture and for exhausting the waste gases, said intake and compression chamber and said combustion and exhaust chamber being defined by stationary wall means and moving wall means,
   means for sequestering a portion of the gases from the compression chamber, for saving the sequestered gases, and for releasing the sequestered gases into the combustion and exhaust chamber at a predetermined time in the engine cycle after a partial suction is created in the combustion and exhaust chamber before the gases are exhausted from the engine, said sequestering, saving, and releasing means being controlled by said moving wall means and the position of said sequestering, saving, and releasing means with respect to the stationary wall,
   wherein said means for sequestering a portion of the gases from the compression chamber, said means for saving the sequestered gases, and said means for releasing the sequestered gases into the combustion and exhaust chamber are contained in a gate plate means supported by one of said wall means and extending toward and in sliding contact with the other of said wall means which serves as a camming surface for controlling said gate plate means, said gate plate means including:
   housing means,
   piston means received by said housing means, said piston means having a piston wall which defines a pressure saving and transfer chamber means inside said piston means,
   gas transmission guide hole means located in the wall of said piston means on a side of said piston means, said gas transmission guide hole means being blocked and unblocked by said wall means supporting said gate plate means, the blocking and unblocking of said gas transmission guide hole means being controlled by the contact of said gate plate means against said wall means serving as the camming surface, said gas transmission guide hole means being in direct communication with said gas chamber means when said guide hole is unblocked by said wall means supporting said gate plate means, one-way intake valve means located in said piston means on a side of said piston means opposite to the side of the location of said gas transmission guide hole means, said one-way intake valve means being in direct communication with said gas chamber means when said intake valve means is open, said piston means having a proximal end toward said housing and having a distal end away from said housing, said gas transmission guide hole means being located near said proximal end of said piston wall, said gas transmission guide hole means being capable of being blocked by the wall of said housing means and said one-way intake valve means being located near said distal end of said piston means;

bias means for urging said piston means out of said housing means.

2. The internal combustion engine described in claim 1 wherein said moving wall means includes rotating wall means located inside said stationary wall means.

3. The internal combustion engine described in claim 1 wherein said fuel/air mixture is supplied to said gas chamber means by a fuel/air mixture chamber.

4. The internal combustion engine described in claim 1 wherein said moving wall means rotates with respect to said stationary wall means to form a rotating wall means.

5. The internal combustion engine described in claim 1 wherein said gas chamber means has a leading end and a following end and wherein said leaning end is deeper in a radial direction than the following end of the chamber means.

6. The internal combustion engine described in claim 1 wherein:
said stationary wall supports said gate plate means; and
said moving wall serves as a camming surface for said gate plate means.

7. The internal combustion engine described in claim 1 wherein the arrangement of said stationary wall, said moving wall, and said gate plate means serves to trap the fuel/air mixture in the compression chamber and retains the fuel/air mixture int he pressure saving and transfer chamber of the gate plate until the gate plate reaches the combustion and exhaustion chamber after which time the trapped fuel/air mixture is released from the gate plate to the combustion and exhaustion chamber.

8. The internal combustion engine described in claim 1 wherein the arrangement of said moving wall, said stationary wall, and said gate plate means provides that as long as gate plate means is in the compression chamber, said gas transmission guide hole is blocked, and the compressed fuel/air mixture trapped within said pressure saving and transfer chamber cannot escape.

9. The internal combustion engine described in claim 1 wherein the arrangement of said moving wall, said stationary wall, and said gate plate means provides that when said gate plate means reaches the combustion chamber which has a greater height than the compression chamber, said gas transmission guide hole becomes unblocked and releases the trapped compressed fuel/air mixture into said combustion chamber.

10. The internal combustion engine described in claim 1 wherein said moving wall means rotates with respect to said stationary wall means to form a rotating wall means.

11. The internal combustion engine described in claim 1 wherein said gate plate means are supported by said stationary wall means.

12. A gate plate means for an internal combustion engine, said gate plate means comprising:
cylindrical housing means,
piston means received by said housing means, said piston means having a piston wall which defines a pressure saving and transfer chamber means inside said piston means,
gas transmission guide hole means located in the wall of said piston means on a side of said piston means,
one-way intake valve means located in said piston means on a side of said piston means opposite to the side of the location of said gas transmission guide hole means,
bias means for urging said piston means out of said housing means,
wherein said gas transmission guide hole means, said pressure saving and transfer chamber means, and said one-way intake valve means provide a path for gas flow from one side to the other side of said piston means,
wherein said piston means has a proximal end toward said housing and has a distal end away from said housing,
said gas transmission guide hole means is located near said proximal end of said piston wall, said gas transmission guide hole means being capable of being blocked by the wall of said housing means,
said one-way intake valve means is located near said distal end of said piston means.

13. The internal combustion engine described in claim 1 wherein said one-way intake valve is spring-biased in the closed position.

14. The internal combustion engine described in claim 1 further including a solid, spring-biased plate located in said stationary wall at approximately 180 degrees opposite said gate plate means.

15. The internal combustion engine described in claim 14 wherein a line between said gate plate means and said solid, spring-biased plate defines a line of symmetry for an intake and compression chamber and a combustion and exhaust chamber.

16. An internal combustion engine, comprising:
gas chamber means including a fuel/air mixture intake and compression chamber for compressing a fuel/gas mixture and a combustion and exhaust chamber for combusting the fuel/gas mixture and for exhausting the waste gases, said intake and compression chamber and said combustion and exhaust chamber defined by stationary wall means and moving wall means, said moving wall means having sealing ends with rear surfaces,
means for sequestering a portion of the gases from the compression chamber, for saving the sequestering gases, and for releasing the sequestered gases into the combustion and exhaust chamber at a predetermined time in the engine cycle, said sequestering, saving, and releasing means being controlled by said moving wall means and the position of said sequestering, saving, and releasing means with respect to the stationary wall,
wherein said means for sequestering a portion of the gases from the compression chamber, said means for saving the sequestered gases, and said means for releasing the sequestered gases into the combustion and exhaust chamber are contained in a gate plate means supported by one of said wall means and extending toward and in sliding contact with the other of said wall means which serves as a camming surface for controlling said gate plate means, and wherein rear surfaces of sealing ends of said moving wall means are gently sloped to provide camming surfaces for said gate plate means that cause the internal pressure saving and transfer chamber to retain saved gases until a suction is provided in the combustion and exhaust chamber; and wherein said gate plate means has a housing means and a piston means received by said housing means, said piston means having two opposite sides; means for one-way entry of the sequestered gases on the one side and means for releasing of the sequestered gases on the opposite side with means therebetween to provide direct communication for gas flow from one side to the other side of said piston means; wherein said piston means has a proximal end toward said housing and a distal end away from said housing, the means for one way entry of the sequestering gases being near the distal end of said piston means and the means for releasing the sequestering gases being near the proximal end of said piston means.

* * * * *